(12) United States Patent
Christensen

(10) Patent No.: US 8,779,278 B2
(45) Date of Patent: Jul. 15, 2014

(54) AIR SUPPORTED PHOTOVOLTAIC SYSTEM

(75) Inventor: Stephen R. Christensen, Windham, NH (US)

(73) Assignee: Raytheon Company, Waltham, MA (US)

( * ) Notice: Subject to any disclaimer, the term of this patent is extended or adjusted under 35 U.S.C. 154(b) by 827 days.

(21) Appl. No.: 12/924,250

(22) Filed: Sep. 23, 2010

(65) Prior Publication Data

US 2012/0073625 A1    Mar. 29, 2012

(51) Int. Cl.
*H01L 31/00* (2006.01)

(52) U.S. Cl.
USPC .......................................... 136/246

(58) Field of Classification Search
USPC .......................................... 136/246
See application file for complete search history.

(56) References Cited

U.S. PATENT DOCUMENTS

| | | | |
|---|---|---|---|
| 4,290,411 A | 9/1981 | Russell |
| 4,574,659 A | 3/1986 | Arndt |
| 4,762,298 A | 8/1988 | Wood |
| 5,227,618 A | 7/1993 | Shingleton |
| 7,374,137 B2 | 5/2008 | Staney |
| 2009/0260620 A1 | 10/2009 | Winger et al. |

*Primary Examiner* — Jennifer Michener
*Assistant Examiner* — Dustin Q Dam
(74) *Attorney, Agent, or Firm* — Daly, Crowley, Mofford & Durkee, LLP

(57) ABSTRACT

An air supported photovoltaic system includes a primary inflatable member with at least one facet thereon and a curved surface configured to rock the inflatable member and change the orientation of the facet to angle it towards the sun. A flexible array of photovoltaic cells is applied to the facet.

25 Claims, 8 Drawing Sheets

AIR SUPPORTED PHOTOVOLTAIC SYSTEM

FIELD OF THE INVENTION

The subject invention relates to solar power collection.

BACKGROUND OF THE INVENTION

Solar cells are sometimes mounted on a mechanical support structure which can tilt the solar cells at various angles to aim them at the sun as it moves across the sky and also rotate the solar cells to account for the position of the sun in the sky at different latitudes and during different seasons of the year. See, for example, U.S. Pat. Nos. 4,574,659; 7,374,137; and 4,290,411 all incorporated herein by this reference.

Such support structures usually include motorized drives which require electricity. The support structures and their controlling electronics can be expensive, cumbersome, and complicated. Transporting such support structures can be difficult and expensive, especially in situations where the solar cells are to be used temporarily, for example, in a military exercise or on a battlefield.

U.S. Pat. No. 5,227,618, incorporated herein by this reference, discloses a rigid detector or photovoltaic device supported by two pressurized supports. Depressurizing one support relative to the other varies the angle of the rigid detector. U.S. Pat. No. 4,762,298, incorporated herein by this reference, discloses a heliostat mirror supported on the free end of an inflatable bag. A system of cables and motors is used to change the orientation of the mirror. Patent Application Publication No. 2009/0260620, also incorporated herein by this reference, discloses an inflatable concentrator.

The known prior art, however, fails to disclose a viable air supported structure for photovoltaic devices and solar power collection which meets the needs addressed by the invention.

SUMMARY OF THE INVENTION

In one aspect, the invention features an air supported photovoltaic system which is collapsible and light weight for easy transportation and deployment. One preferred system is fairly low cost and involves no complex components. Typically, a primary inflatable member rocks to change the orientation of the photovoltaic cells it supports to track the movement of the sun across the sky. Rocking the inflatable member can be accomplished manually or using a motorized subsystem.

The subject invention, however, in other embodiments, need not achieve all these objectives and the claims hereof should not be limited to structures or methods capable of achieving these objectives.

In one aspect, the invention features an air supported photovoltaic system comprising a primary inflatable member including at least one facet thereon and a curved surface configured to rock the inflatable member and change the orientation of the facet to angle it towards the sun. An array of photovoltaic cells, typically flexible in configuration, is applied to the facet. The primary inflatable member usually includes a bladder covered with fabric.

The system may further include flexible fastener members securing the primary inflatable member to a surface and positioning the array at a given orientation. In one example, the flexible fastener members are adjustable to vary the orientation of the facet. The flexible fastener members can be manually adjusted. Alternatively, a motorized subsystem can be included for automatically adjusting the flexible fastener members to vary the orientation of the facet. In one design, a pneumatically actuated subsystem engages the primary inflatable member for changing the orientation of the facet.

Typically, the facet is substantially flat and the primary inflatable member is in the shape of a half cylinder. In another example, the primary inflatable member is tapered along its length.

In one embodiment, a secondary inflatable member includes a facet thereon receiving a plurality of primary inflatable members thereon and a curved surface configured to rock the secondary inflatable member to orient its facet parallel or substantially parallel to the earth's rotational axis.

One air supported photovoltaic system in accordance with the invention features a plurality of primary inflatable members including at least one facet thereon and a curved surface configured to rock the inflatable member and change the orientation of the facet to angle it towards the sun; a flexible array of photovoltaic cells applied to the facet; and a secondary inflatable member including a facet thereon receiving the plurality of primary inflatable members thereon and a curved surface configured to rock the secondary inflatable member to orient its facet parallel or substantially parallel to the earth's rotational axis.

One air supported photovoltaic method in accordance with the invention features constructing a primary inflatable member to include at least one facet thereon and a curved surface configured to rock the inflatable member and change the orientation of the facet to angle it towards the sun and applying an array of photovoltaic cells to the facet. The primary inflatable member is deflated for storage and/or transport. In the field, the primary inflatable member is inflated and the orientation of the facet is adjusted as the sun moves across the sky.

Flexible fastener members can be supplied to secure the primary inflatable member to a surface such as the ground and position the array at a given orientation. The method may further include adjusting the flexible fastener members.

A secondary inflatable member can also be supplied. The secondary inflatable member may include a facet thereon receiving the primary inflatable member and a curved surface configured to rock the secondary inflatable member to orient its facet parallel or substantially parallel to the earth's rotational axis.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
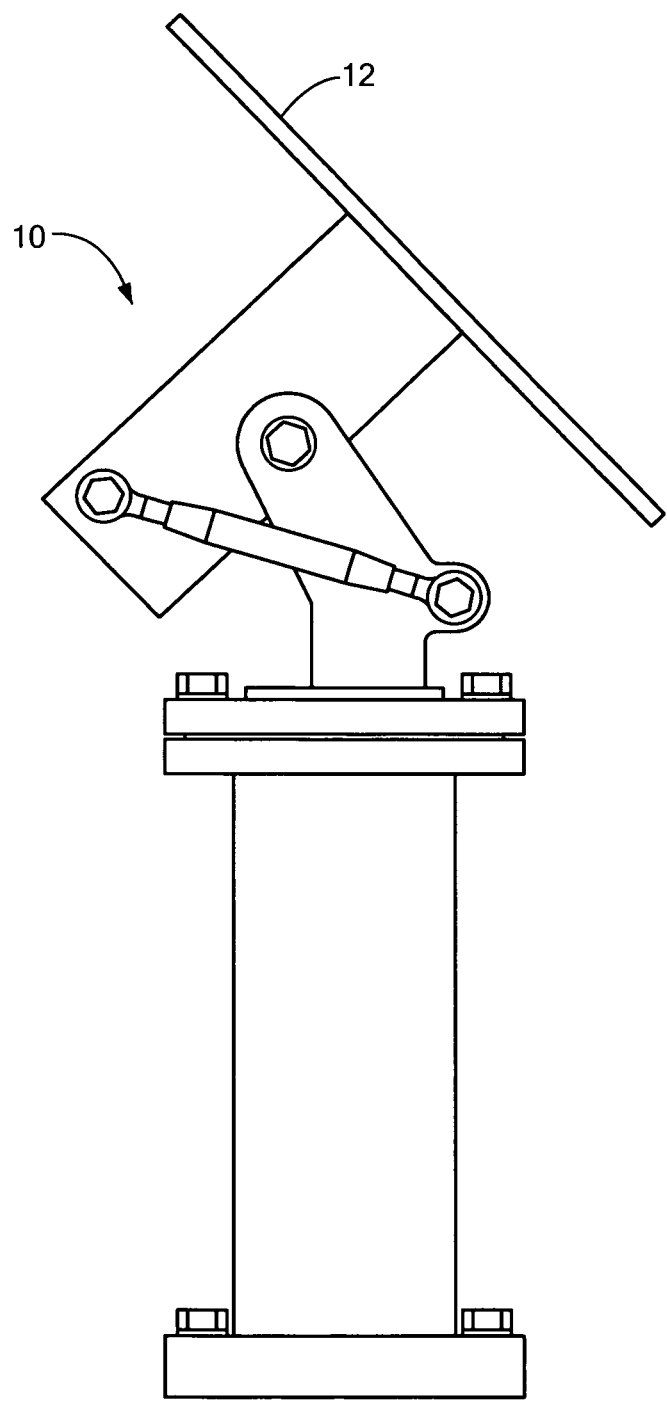
FIG. 1 is a schematic side view showing an example of a prior art mechanical support structure for a solar cell array.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
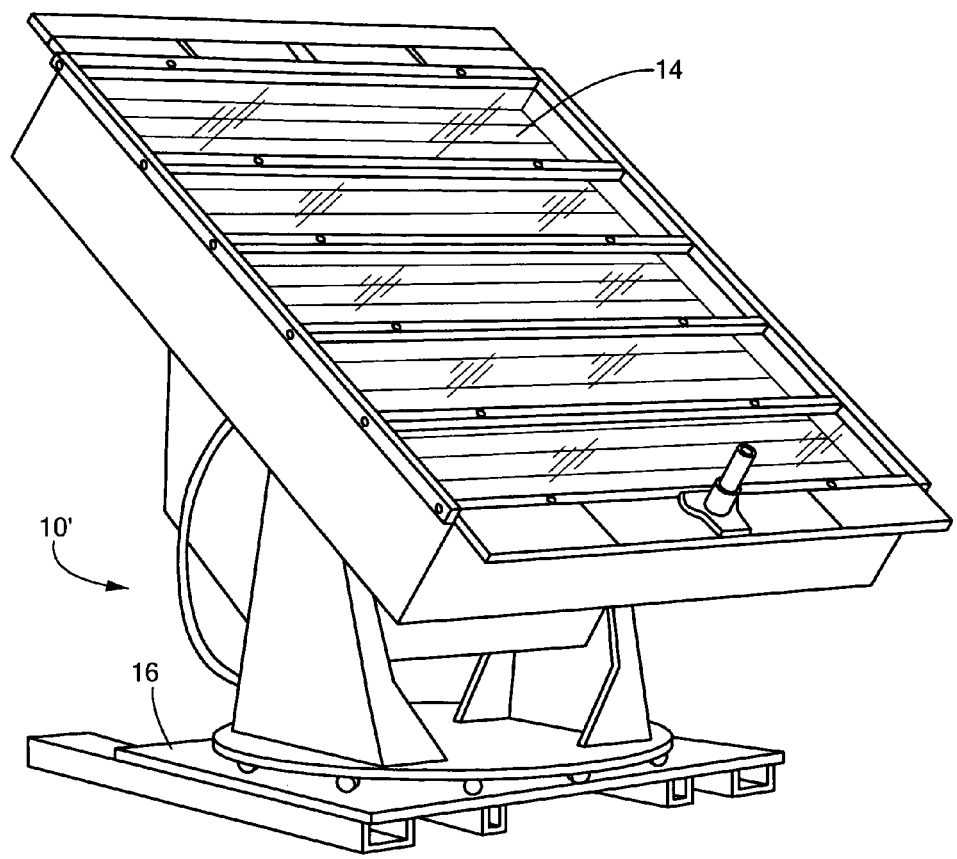
FIG. 2 is a schematic three-dimensional front view showing another example of a mechanical support for a photovoltaic system.

FIG. 1 shows an example of mechanical support structure 10 for a group of solar cells located on plate 12. As is known in the art, support system 10 is engineered to change the angle of plate 12. FIG. 2 shows another example of a mechanical support structure 10' for solar cells 14. System 10' is designed to change the elevation angle of solar cells 14. System 10' also rotates on support 16.

Figure 3:
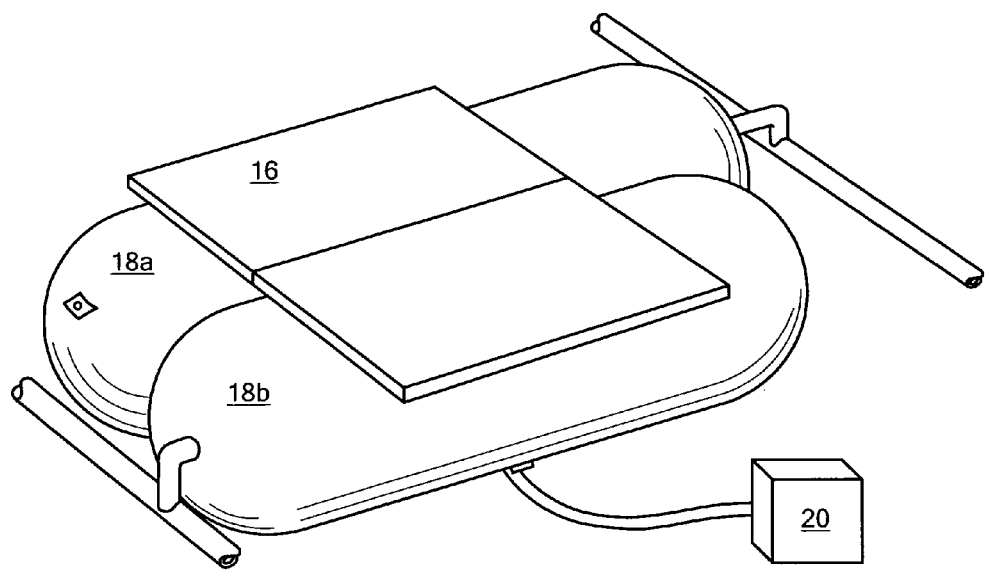
FIG. 3 is a schematic three-dimensional view showing a photovoltaic device supported by two pressurized supports in accordance with the prior art.

FIG. 3 shows rigid surface 16 which may include a detector or solar cells mounted thereon. Surface 16 is disposed on inflatable supports 18a and 18b. Control system 20 is used to decrease the air pressure in one inflatable support and to increase the air pressure in the other inflatable support to change the elevation angle of plate 16.

Figure 4:
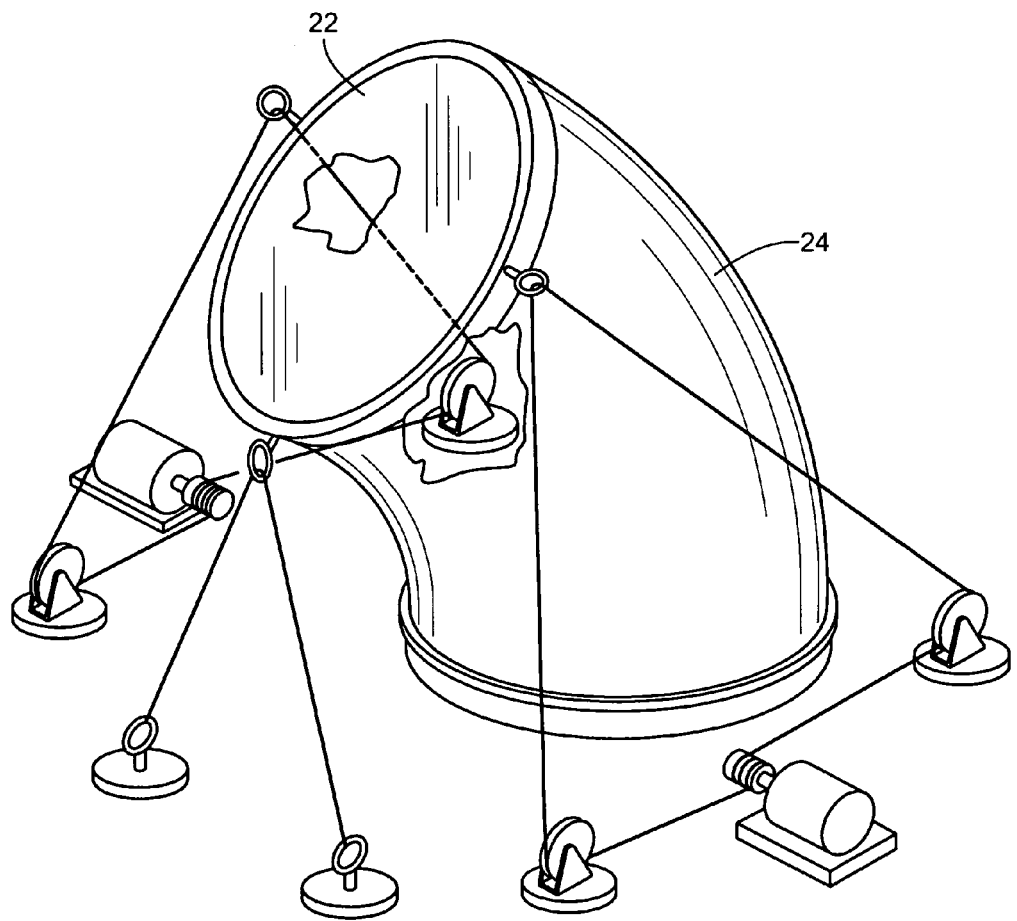
FIG. 4 is a schematic view of a heliostat mirror supported by an inflatable bag in accordance with an example of the prior art.

FIG. 4 shows mirror 22 supported on the free end of inflatable bag 24. The orientation of mirror 22 is controlled by a system of wires, pulleys, and motors as shown.

Figure 5:
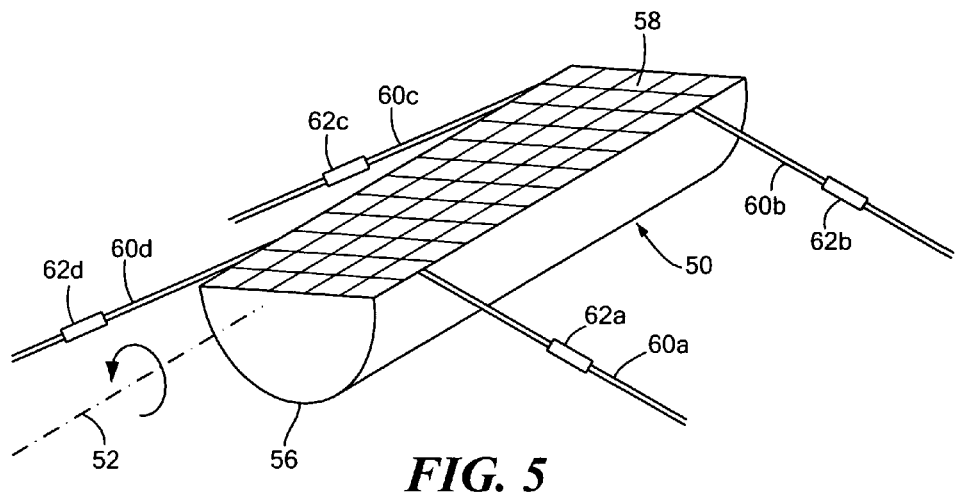
FIG. 5 is a schematic three-dimensional view of an example of an air supported photovoltaic system in accordance with the invention.
Figure 6:
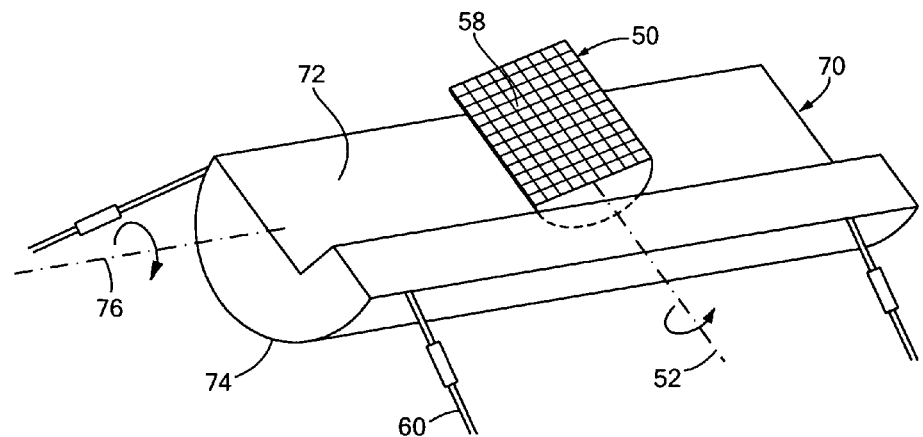
FIG. 6 is a schematic three-dimensional front view showing an example of a primary inflatable member mounted to a secondary inflatable member in accordance with an example of the invention.

FIG. 5 shows an example of a primary inflatable member 50 in accordance with the invention. Typically member 50 is a fabric covered bladder similar to those used in inflatable towable recreation tubes and the like pulled behind a boat. Such structures are durable and fold into a compact shape for storage. In the example shown, member 50 is in the shape of one half of a cylinder and has a longitudinal axis 52. Member 50 is engineered to define substantially flat facet 54 and curved surface 56.

A flexible array of solar cells 58 is attached to facet 54. Flexible, light weight, thin solar chargers are available from Powerfilm, Inc. (Ames, Iowa) and other manufacturers. When member 50 is deflated, flexible array 58 can be rolled up into a compact shape along with member 50. Array 58 can be glued or stitched to or integrated with the fabric over facet 54. Rigid solar cells can also be used.

Curved surface 56 is provided to rock inflatable member 50 while it is inflated and change the orientation of facet 54 and the solar cells thereon to angle them towards the sun. Thus, primary inflatable member 56 rocks about axis 52 to change the elevation angle of photovoltaic cells 58.

In this particular example, flexible fastener straps (or ropes or cables) 60a-60b all include adjustment buckles 62a-62d, respectively. The straps extend from the inflatable member 50 to the ground where they are staked or otherwise secured to hold member 50 on the ground. By adjusting the length of the straps via their adjustment buckles, the elevation angle of photovoltaic cells 58 is also adjusted. In this particular example, the length of the straps may be manually adjusted. For example, in the early morning, straps 60a and 60b can be lengthened and straps 60c and 60d shortened to angle photovoltaic cells 58 into the low lying sun. At midday, the straps are all adjusted so that they are all the same length. In the late afternoon, straps 60c and 60d are lengthened and straps 60a and 60b are shortened.

Since all of the components of this system are flexible and light weight, the system can be more compactly and more easily stowed and transported. The system can be manufactured at a low cost, and used, for example, at 28 watts to charge batteries on the battle field. Fuel requirements are then lowered because not as much generator power is required. Typically, more than one inflatable member such as the one depicted in FIG. 5 can be used.

Figure 7:
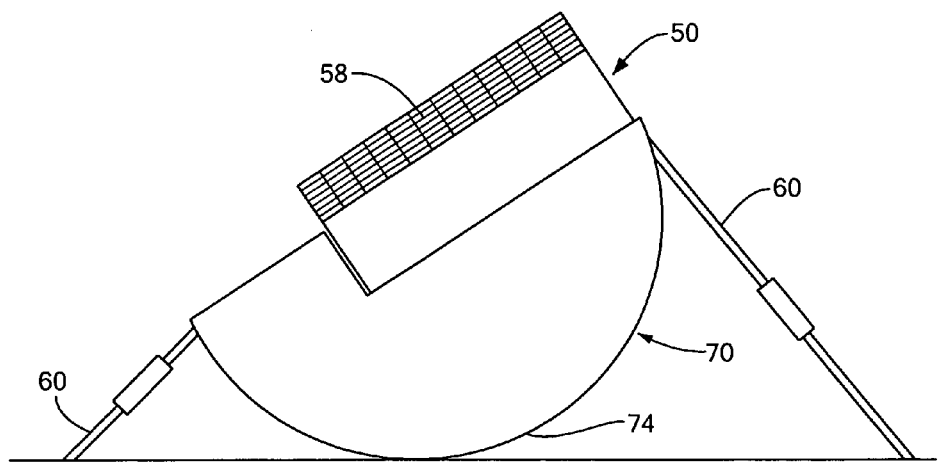
FIG. 7 is a schematic end view of the system shown in FIG. 6.
Figure 8:
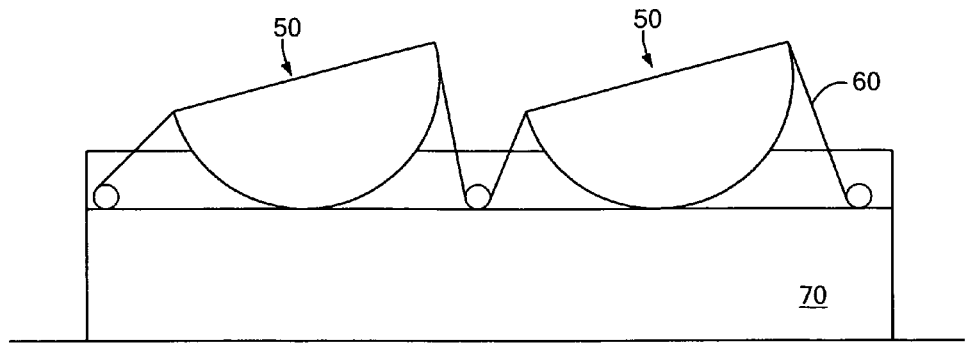
FIG. 8 is a schematic cross-sectional side view of the system shown in FIGS. 6-7.

FIG. 2 shows one primary member 50 disposed relative to secondary inflatable member 70. Secondary inflatable member 70 includes facet 72 for supporting a number of primary inflatable members 50 and a curved surface 74 configured to rock secondary inflatable member 70 to orient facet 72 parallel or substantially parallel to the earth's rotational axis. Secondary inflatable member 70 thus has a longitudinal axis 76 oriented (in the field) parallel or substantially parallel to the earth's rotational axis and secondary inflatable member 70 rocks on curved surface 74 about axis 76. Primary inflatable member 50 rocks on facet 72 to rotate about axis 52 to change the elevation of the photovoltaic cells it supports and secondary inflatable member 70 rocks about axis 76 to change the angle of facet 72 to account for different latitudes and seasonal variations regarding the position of the sun in the sky. Typically, secondary inflatable member 70, once inflated and set up, need not be adjusted for a fairly long period of time. Again, straps with buckles as shown can be used to secure secondary inflatable member 70 to the ground and fix the angle of facet 72. FIGS. 7 and 8 further describe this particular example and FIG. 8 depicts how strap 60 can be used to simultaneously adjust the orientation of the primary inflatable members.

Figure 9:
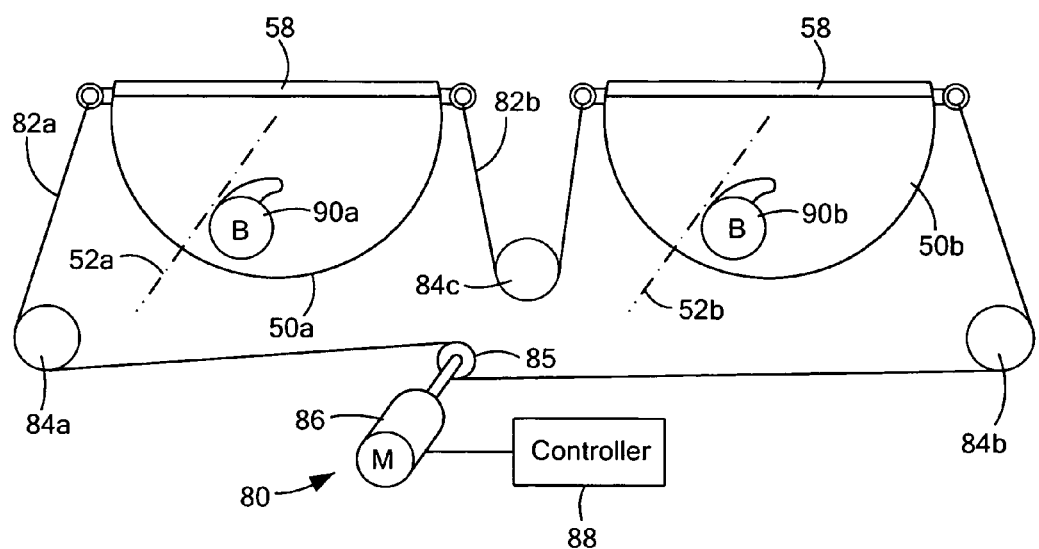
FIG. 9 is a schematic end view showing a motorized system which may be used to automatically change the orientation of one or more inflatable members in accordance with the invention.

FIG. 9 shows an example of a motorized subsystem 80 for automatically adjusting the orientation of two or more primary inflatable members 50a and 50b. Flexible straps, wires, or ropes extend from one side of primary inflatable member 50a as shown at 82a, around pulley 84a, around motor driven spindle 85, around pulley 84b, and to one side of primary inflatable member 50b. Primary members 50a and 50b are tied to each other via flexible strap, rope, or cable 82b about pulley 84c. Motor 86 turns spindle 85 clockwise or counter clockwise to rotate primary inflatable members 50a and 50b about their longitudinal axes 52a and 52b simultaneously. Controller 88 may be provided including a clocking function to activate motor 86 to automatically cause primary inflatable members 50a and 50b to track the sun's movement across the sky.

Other motorized subsystems for automatically adjusting the orientation of the primary inflatable members and causing them to rock on their curved surfaces are within the scope of the subject invention.

In the design shown in FIG. 9, blowers 90a and 90b may be employed to inflate primary inflatable members 50a and 50b, respectively. Energy for operating blowers 90a and 90b may be supplied by photovoltaic cells 58. For example, the deflated primary inflatable members can be laid out on the ground with their flexible solar cell array facing upward. The solar cells will then begin to generate electricity for powering blowers 90a and 90b which remain on until the inflatable members are fully inflated. Energy from the solar cells can also be used to provide energy to motor 86 and controller 88.

In another example, blowers 90a and 90b operate continuously and the heated air exiting the inflatable members is utilized in some fashion, for example, to heat a tent or other structure. Air within the inflatable members is heated due to the presence of the solar cells or solar cell array that they support. When blowers 90a and 90b operate continuously, another added benefit is cooling of the solar cell array. Cooling fins and the like can be used within the inflatable members as desired.

Figure 10:
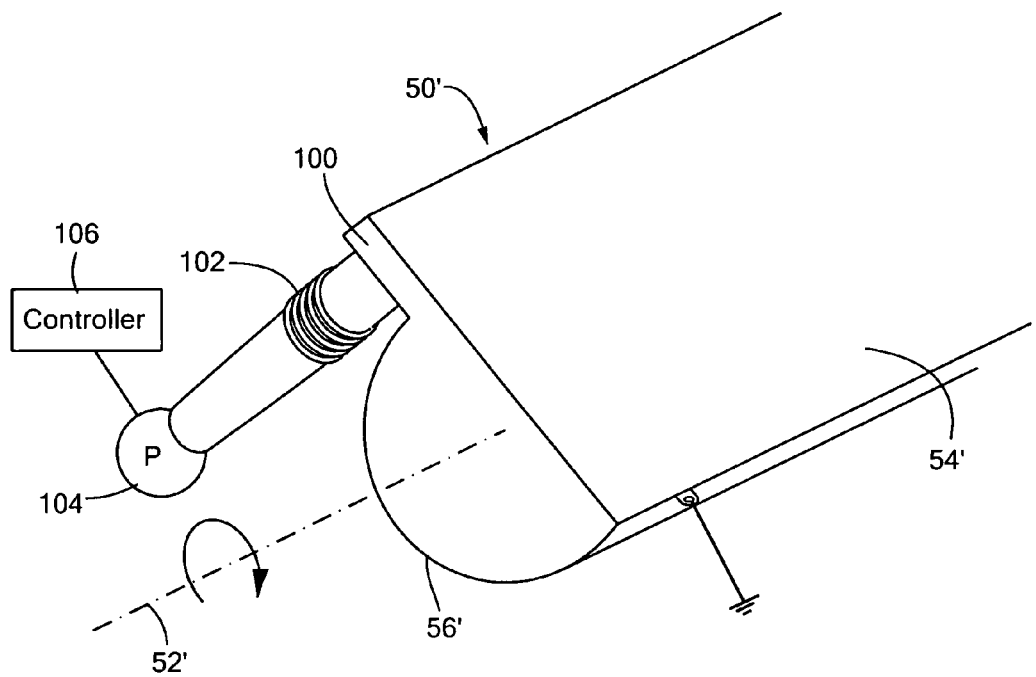
FIG. 10 is a schematic view showing an example of another type of subsystem for changing the orientation of the inflatable member in accordance with the invention.

FIG. 10 shows an example of inflatable member 50' with curved surface 56' and facet 54'. Primary inflatable member 50' also defines surface 100 and inflatable bellows assembly 102 is used for changing the orientation of facet 54'. As the air pressure in bellows 102 is adjusted, primary inflatable member 50' rocks on curved surface 56' about axis 52'. Pump 104 provides air to bellows 102 under the control of controller 106 which may include means for operating pump 104 to change the angle of facet 54' and continuously track the sun as it moves across the sky.

Figure 11:
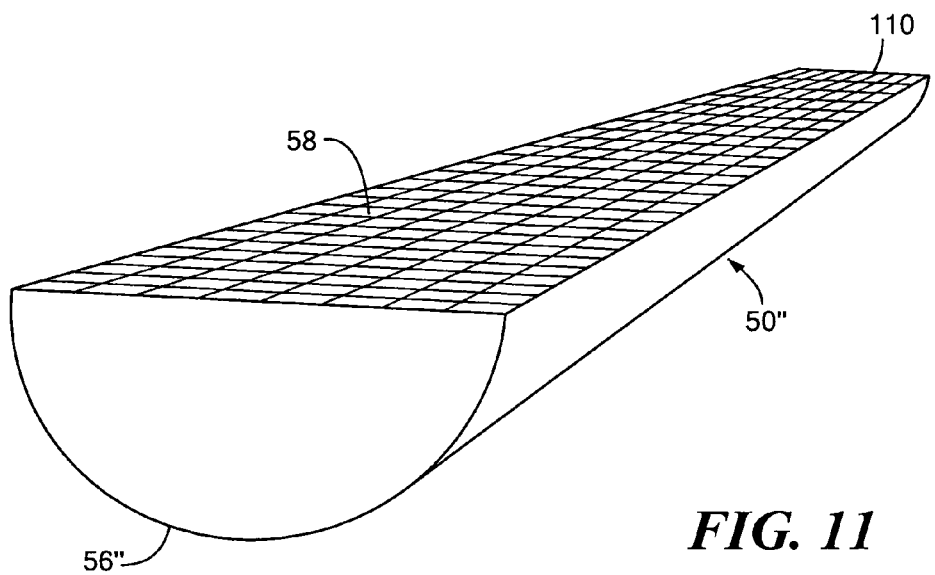
FIG. 11 is a schematic three-dimensional view showing another example of an inflatable member in accordance with the subject invention.

FIG. 11 shows an example of an inflatable member 50" still including curved surface 56" and a facet with solar cells 58 thereon but, in this example, primary inflatable member 50" is cone-shaped and includes a tapered end as shown at end 110. The amount of taper will depend on the latitude where the inflatable member is expected to be deployed. In this way, the elevation and azimuth angles of the solar cells can be adjusted simultaneously. Again some type of straps and either a manual adjustment or an automatic adjustment is possible with this type of a primary inflatable structure.

The result is that most, if not all of the components of the inventive system are foldable, rollable, collapsible, and the like for easy and efficient storage and transportation. Manufacturing costs are expected to be fairly low. The output of flexible photovoltaic cells is maximized due to the ability to easily adjust the angle of the primary inflatable structure. Multiple collectors can be rotated by a single clock timed winch-type system from sunrise to sunset. The fabric powered inflatable structures can be densely packed for easy transport and are yet rugged enough for military and other uses.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. An air supported photovoltaic system comprising:
    a primary inflatable member including at least one facet thereon and a curved surface configured to rock the inflatable member and change the orientation of the facet to angle it towards the sun; and
    an array of photovoltaic cells applied to the facet; and including a secondary inflatable member including a facet thereon directly receiving the primary inflatable member and a curved surface configured to rock the secondary inflatable member to orient its facet parallel or substantially parallel to the earth's rotational axis.

2. The system of claim 1 in which the array of photovoltaic cells is flexible.

3. The system of claim 1 further including flexible fastener members securing the primary inflatable member to a surface and positioning the array at a given orientation.

4. The system of claim 3 in which the flexible fastener members are adjustable to vary the orientation of the facet.

5. The system of claim 4 in which the flexible fastener members are manually adjustable.

6. The system of claim 3 further including a motorized subsystem for automatically adjusting the flexible fastener members to vary the orientation of the facet.

7. The system of claim 1 further including a pneumatically actuated subsystem engaging the primary inflatable member for changing the orientation of the facet.

8. The system of claim 1 in which the facet is substantially flat.

9. The system of claim 1 in which the primary inflatable member is in the shape of a half cylinder.

10. The system of claim 1 in which the primary inflatable member is tapered along its length.

11. The system of claim 1 in which the primary inflatable member includes a bladder covered with fabric.

12. An air supported photovoltaic system comprising:
    a plurality of primary inflatable members including at least one facet thereon and a curved surface configured to rock the inflatable member and change the orientation of the facet to angle it towards the sun;
    a flexible array of photovoltaic cells applied to the facet; and
    a secondary inflatable member including a facet thereon directly receiving the plurality of primary inflatable members thereon and a curved surface configured to rock the secondary inflatable member to orient its facet parallel or substantially parallel to the earth's rotational axis.

13. The system of claim 12 further including flexible fastener members for the plurality of primary inflatable members and the secondary inflatable member.

14. The system of claim 13 in which the flexible fastener members are adjustable.

15. The system of claim 14 in which the flexible fastener members are manually adjustable.

16. The system of claim 13 further including a motorized subsystem for automatically adjusting the flexible fastener members.

17. The system of claim 12 in which each primary inflatable member is in the shape of a half cylinder.

18. The system of claim 12 in which the primary inflatable members each include a bladder covered with fabric.

19. A method comprising:
    constructing a primary inflatable member to include at least one facet thereon and a curved surface configured to rock the inflatable member and change the orientation of the facet to angle it towards the sun;
applying an array of photovoltaic cells to the facet;
deflating the primary inflatable member for storage and/or transport;
inflating the primary inflatable member in the field; and
adjusting the orientation of the facet as the sun moves across the sky; and supplying a secondary inflatable member including a facet thereon directly receiving the primary inflatable member and a curved surface configured to rock the secondary inflatable member to orient its facet parallel or substantially parallel to the earth's rotational axis.

20. The method of claim 19 in which the array of photovoltaic cells is flexible.

21. The method of claim 19 further including supplying flexible fastener members to secure the primary inflatable member to a surface and position the array at a given orientation.

22. The method of claim 21 further including adjusting the flexible fastener members.

23. The method of claim 19 in which the primary inflatable member is in the shape of a half cylinder.

24. The method of claim 19 in which the primary inflatable member is tapered along its length.

25. The method of claim 19 in which the primary inflatable member includes a bladder covered with fabric.

\* \* \* \* \*